United States Patent [19]
Fulghum et al.

[11] Patent Number: 5,504,750
[45] Date of Patent: Apr. 2, 1996

[54] METHOD AND APPARATUS FOR A RADIO SYSTEM OPERATING ON SHARED COMMUNICATION CHANNELS

[75] Inventors: Tracy L. Fulghum, Sunrise; Jimmy W. Cadd, Coral Springs, both of Fla.

[73] Assignee: Motorola, Inc., Schaumburg, Ill.

[21] Appl. No.: 283,866

[22] Filed: Aug. 1, 1994

[51] Int. Cl.⁶ .................................. H04J 3/16; H04J 3/06
[52] U.S. Cl. ........................ 370/95.1; 375/202; 370/85.2
[58] Field of Search .................................. 370/95.1, 95.2, 370/95.3, 85.2, 50, 18, 85.8, 69.1, 85.3; 340/825.5, 825.07, 825.08; 375/202, 203, 260, 365, 200; 455/34.1

[56] References Cited

U.S. PATENT DOCUMENTS

| | | | |
|---|---|---|---|
| 4,850,036 | 7/1989 | Smith | 375/1 |
| 5,134,615 | 7/1992 | Freeburg et al. | 370/95.3 |
| 5,142,534 | 8/1992 | Simpson et al. | 370/95.1 |
| 5,229,198 | 3/1993 | Kay et al. | 370/95.3 |
| 5,257,398 | 10/1993 | Schaeffer | 455/33.1 |
| 5,287,384 | 2/1994 | Avery et al. | 375/1 |
| 5,291,475 | 3/1994 | Bruckert | 370/95.3 |
| 5,297,144 | 3/1994 | Gilbert et al. | 370/95.2 |
| 5,311,504 | 5/1994 | Colamonico et al. | 370/50 |
| 5,381,443 | 1/1995 | Borth et al. | 370/95.1 |

*Primary Examiner*—Douglas W. Olms
*Assistant Examiner*—Chau T. Nguyen
*Attorney, Agent, or Firm*—Andrew S. Fuller

[57] ABSTRACT

A method and apparatus is provided for a operating a radio system (100) on shared communication channels. The system (100) has a sequence of communication channels (205), including a reservation channel, and a channel hopping protocol for operating on the sequence (205). A hop period is defined for the channel hopping protocol. The reservation channel is monitored for at least the channel hop period to find an open communication slot indicated by the absence of a reservation signal (320, 325, 330). Communications is then established within the open slot, and channel hopping occurs through the sequence of communication channels in the open slot (345, 350). The slot is preserved by transmitting a reservation signal on the reservation channel, when operating on the reservation channel (355, 360).

9 Claims, 5 Drawing Sheets

100

METHOD AND APPARATUS FOR A RADIO SYSTEM OPERATING ON SHARED COMMUNICATION CHANNELS

TECHNICAL FIELD

This invention relates in general to a radio communication system, and more particular, to a radio communication system having communication devices operating over shared communication channels.

BACKGROUND

Radio communication systems which support communication among several users operating in wireless environment over radio frequencies are known. The frequencies used by these systems are a subset of the radio frequency spectrum which are organized into one or more radio communication channels, such as frequency channels. In such a system, for example, a communication link may be established between groups of communication devices within the radio system. The communication link is established over one or more frequency channels for the duration of the communication. Generally, the frequency spectrum available for a given radio system is a limited communication resource, and several users may be competing for this resource. Thus, a radio communication system typically employs a frequency management methodology in order to maximize the efficient use of the available frequencies, and to minimize interference among users. This approach is essential where multiple communication links must be established over shared communication channels.

Many frequency sharing methodologies are known in the art. Examples include, channel hopping, direct sequence spread spectrum, time division multiplex, and other similar schemes. Most prior art frequency sharing methods employ an infrastructure to manage the operational aspects of a radio communication system. An infrastructure typically includes a base station, or some other type of controller, which manages frequency assignments, user access, collision detection and resolution, and other operational aspects of a radio system. These controllers tend to represent a significant cost in the establishment of a radio communication system.

Low cost radio communication systems are becoming an increasingly important segment of the wireless communication market. These low cost systems must also successfully manage frequency allocation among users in order to maximize efficiency and throughput. Therefore, it is desirable to have a low cost radio communication system which promotes efficient use of shared communication resources.

DETAILED DESCRIPTION OF THE PREFERRED EMBODIMENT

Figure 1:
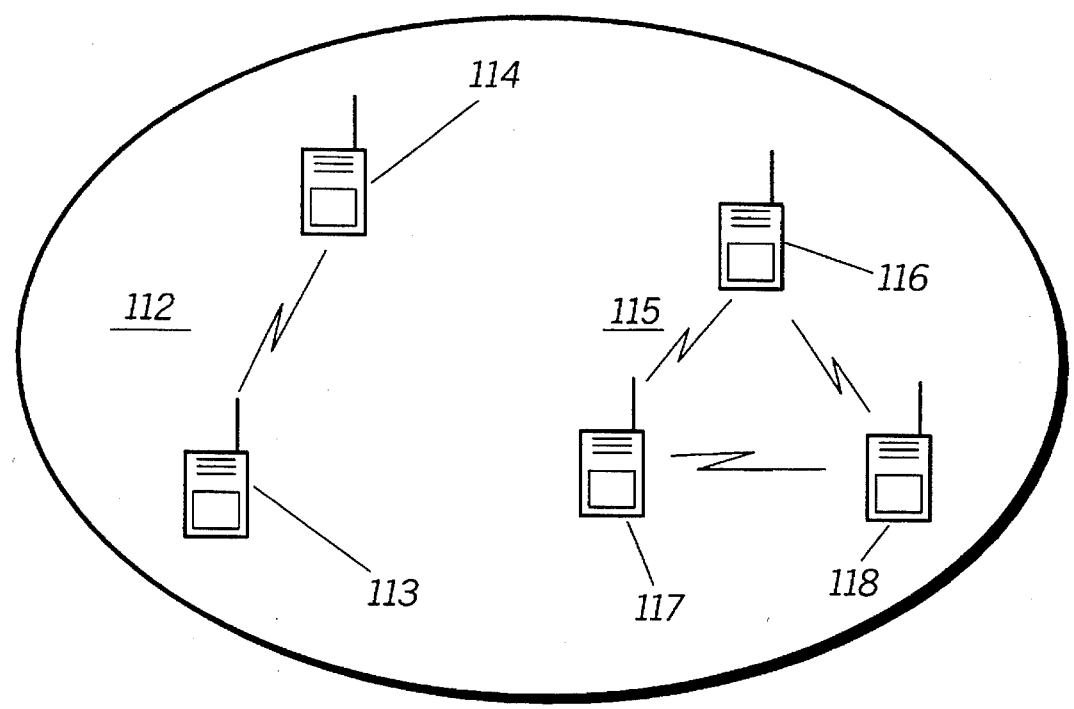
FIG. 1 is a radio communication system having two groups of communicating transceivers, in accordance with the present invention.

Referring to FIG. 1, a radio communication system 100 having different groups of communication devices, such as transceivers, operating under a communication channel hopping protocol is shown, in accordance with the present invention. In the preferred embodiment, the communication devices are two-way portable radio transceivers capable of establishing radio frequency (RF) communication links. Other types of communication devices may be used, such as mobile radios, base stations, repeaters, and the like. The radio system 100 depicted has two groups 112, 115 of communicating transceivers. A first group 112 includes two transceivers 113, 114 with an established communication link between them. A second group 115 includes three transceivers 116, 117, 118 also communicating over an established communication link. The present invention recognizes that interference between the groups of transceivers 112, 115 is likely if both groups of transceivers 112, 115 are operating independently. For example, both groups 112, 115 may be channel hopping over the same sequence of communication channels, or on sequences which overlap. The interference would be significant if the communicating groups 112, 115 were sufficiently close to each other, and were attempting to channel hop simultaneously through the same communication channels. Obviously, a more efficient radio communication system would result if these communicating groups were organized so as to not to interfere with each other. Ordinarily, such is the task of a controller or base station in a managed sophisticated radio communication system. However, if there is no such infrastructure support, the solution becomes more difficult.

According to the present invention, both groups of transceivers 112, 115 channel hop among a predetermined sequence of communication channels. In the preferred embodiment, the communication channels comprise a plurality of frequencies organized into a sequence of frequency channels. The frequencies are a subset of the frequency spectrum available for radio communication. The communication channel may comprise one or more frequency channels, such as a transmit and receive frequency pair, or a similar grouping. A prescribed channel hop period, i.e., the period of time which a transceiver, or group of transceivers, may spend continuously utilizing a given communication channel, is also defined. The channel hopping of the first group 112 is time coordinated with the channel hopping of the second group 115. The time coordinated operation between the groups 112, 115 is achieved using individual transceivers 113, 114, 116, 117, 118, operating under a protocol taught by the present invention, the details of which will be described below. The result is a self-organizing radio communication system 100 which does not require a central controller, such as a base station, for frequency allocation and access management.

Figure 2:
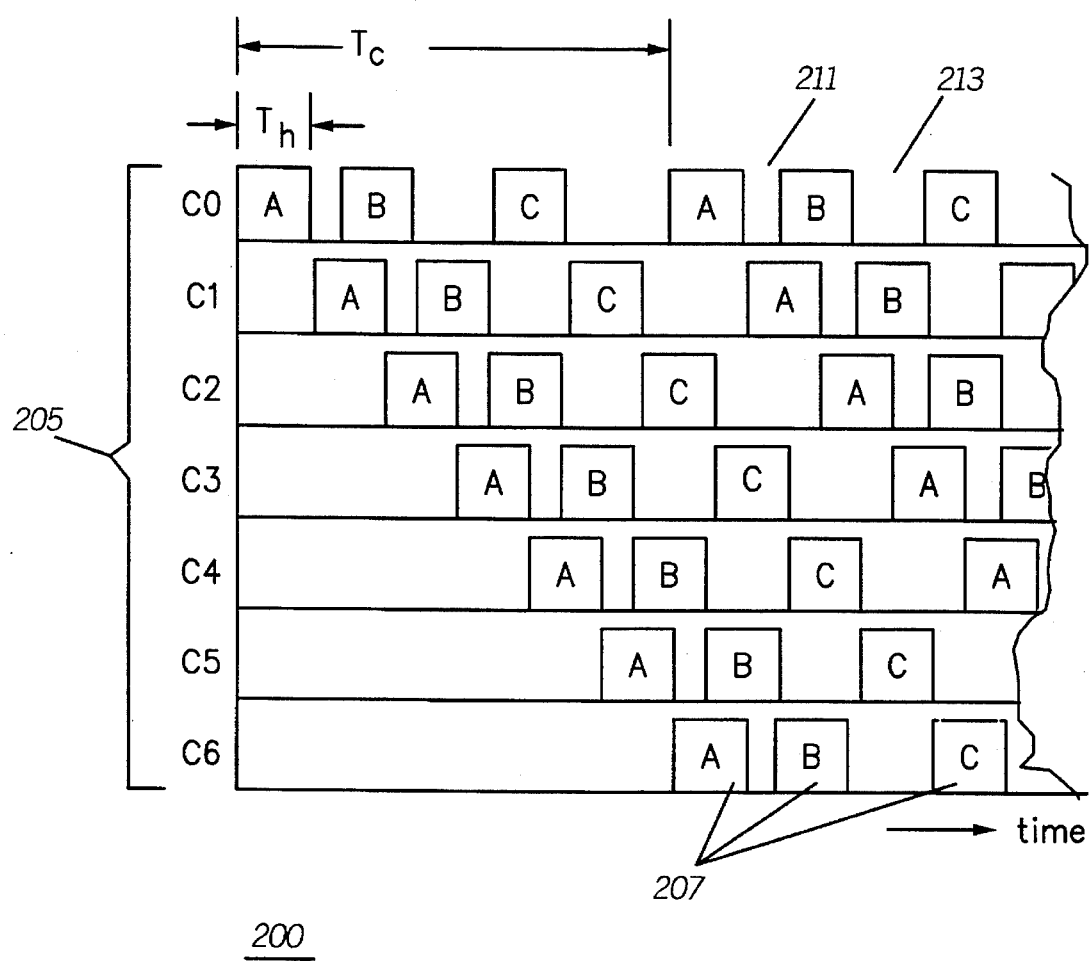
FIG. 2 is a timing diagram of communication on a sequence of seven communication channels, according to the present invention.

FIG. 2 is a timing diagram of communication on a sequence of communication channels 205 utilized by the radio communication system 100. A channel hopping protocol is defined for the sequence and includes parameters such as a channel hop period, $T_h$, and a hop cycle period, $T_c$. The channel hop period is defined as described above. The hop cycle period is the accumulated time spent each cycle through the sequence by a communicating group. FIG. 2 depicts three communicating groups 207, i.e., groups A, B, C, operating cyclically on communication channels C0, C1, C2, C3, C4, C5, C6. Each group A, B, C, is similar in composition and operation to the groups 112, 115 described for FIG. 1. Communication links have been established among transceivers of each group, these communicating transceivers maintain the link by channel hopping among the communication channels of the sequence. The communicating groups 207 do not share common boundaries through the sequence, although they have equal hop periods. Channel use gaps 211, 213 exist between communicating groups. A channel use gap equal to or larger than a channel hop period, such as gap 213, forms an opening which may be claimed for use by a new communicating group. Some channel use gaps, such as gap 211, are smaller than a channel hop period, and cannot accommodate communicating groups requiring the use of a full hop period. Consequently, there may be some channel capacity reduction under this protocol.

The establishment of a communication link requires access to a communication channel which the targeted transceiver is monitoring. Accordingly, the present invention provides for a channel access protocol to facilitate this process. Before establishing a communication link, an initiating transceiver must perform system acquisition, i.e., acquiring a communication slot. A communication slot is generally a time slot, having duration equal to the hop period, which cycles through successive channels of the sequence after each hop period. The radio communication system has a reservation channel (RC) to facilitate acquisition and maintenance of a communication slot on the sequence of communication channels. In the preferred embodiment, the RC is selected from among the sequence of communication channels. Generally, a channel succeeding the RC in the sequence is expected to be monitored by a targeted transceiver. The RC and monitored channel are preselected, and are known to transceivers wishing to create, or participate in, the radio system. During system acquisition, the RC is used to reserve a communication slot. In the preferred embodiment, communication channel C0 is selected as the RC, and the monitored channel is C1. The RC is also used to preserve a communication slot for communicating groups already operating on the sequence. Generally, a transceiver operating on the sequence of communication channels and wishing to secure its communication slot, must transmit a reservation signal while on the RC. In the preferred embodiment, the RC is not used for standard data communication. However, the RC may be used for data communication in other embodiments.

The reservation signal of the present invention has some preferred characteristics. Preferably, the reservation signal is transmitted such that it has an extended communication or transmission range beyond that of the communication range of signals on the other communication channels of the sequence. This may be accomplished by lowering data transmission rates, by providing more robust transmit symbols, or by increasing the transmit power. The extended range offers additional protection from potential interferers operating outside the normal communication range of a member of a communicating group but within communication range of another member. Another signal used in one of the embodiments described below is the channel busy signal. The channel busy signal, preferably has characteristics similar to that of the reservation signal, and may be transmitted similar to the reservation signal.

Figure 3:
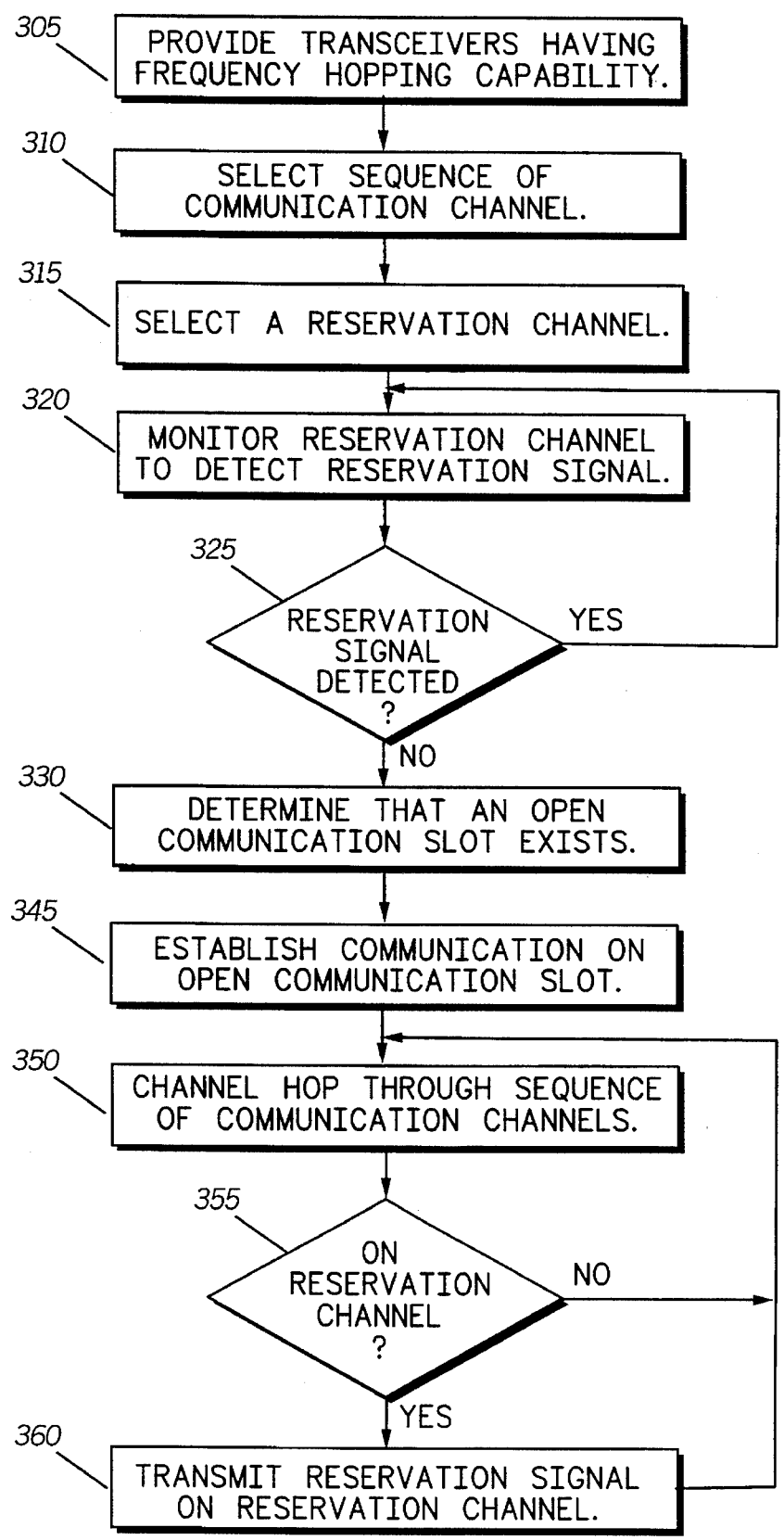
FIG. 3 is a flowchart of procedures used in the communication protocol in accordance the present invention.

FIG. 3 shows a summary of the procedures needed to operate a radio communication system, according to the present invention. As indicated earlier, transceivers wishing to participate in the radio system must be capable of supporting the channel hopping protocol of the present invention, step 305. An initiating transceiver, for example, transceiver 113 of FIG. 1, first selects the sequence of communication channels on which it wishes to establish communication, step 310. A reservation channel is also selected, step 315. The reservation channel is selected from among the sequence of communication channels and is predefined for a particular sequence. Next, the initiating transceiver must secure a communication slot on the sequence of communication channels. The initiating transceiver monitors the reservation channel to detect whether a reservation signal is being transmitted, steps 320, 325. Preferably, the reservation channel is monitored for a duration of at least the channel hop period to detect a reservation signal. If a reservation signal is not detected during the monitor period, the initiating transceiver makes a determination that an open communication slot exists, step 330. In a first embodiment, an open communication slot is assumed if a duration of at least the hop period is observed without a reservation signal being transmitted on the reservation channel. In a second embodiment (see FIG. 4), further steps are taken to determine whether a channel use collision occurred between two initiating transceivers.

In the second embodiment, the channel succeeding the reservation channel is used as a second reservation channel or collision avoidance channel. Here, the second reservation channel is first monitored to detect whether a channel busy signal is being transmitted. If a channel busy signal is detected, a collision has occurred and operation on the sequence is terminated. The process of acquiring the system may be aborted, or restarted after a random period of time. If no channel busy signal is detected, a channel busy signal is transmitted by the initiating transceiver to notify others that system acquisition is in progress. This collision avoidance approach can account for the cases where two initiating transceivers attempt to acquire a slot in close succession. If a collision was not detected, the initiating transceiver determines that an open communication slot exists and proceeds with establishing communication.

When an open communication slot exists, the initiating transceiver attempts to establish communication with a target transceiver, step 345. Identification information for a target transceiver is transmitted on the open communication slot, typically on the channel of the sequence succeeding the reservation channel (first embodiment), or the collision avoidance channel (second embodiment). Communication is established when the targeted transceiver receives the call. Once communication is established, both the initiating and target transceivers can channel hop in unison through the sequence of communication channels until the communication link is broken, step 350. The protocol requires that a communication slot be reserved each cycle through the sequence communicating by transmitting a reservation signal on reservation channel, if continued use of the sequence of communication channels is required. Thus, the initiating transceiver and/or the target transceiver, and other communicating groups operating on the sequence, transmit a reservation signal as they cycle through the reservation channel to preserve their respective communication slot, steps 355, 360.

Figure 4:
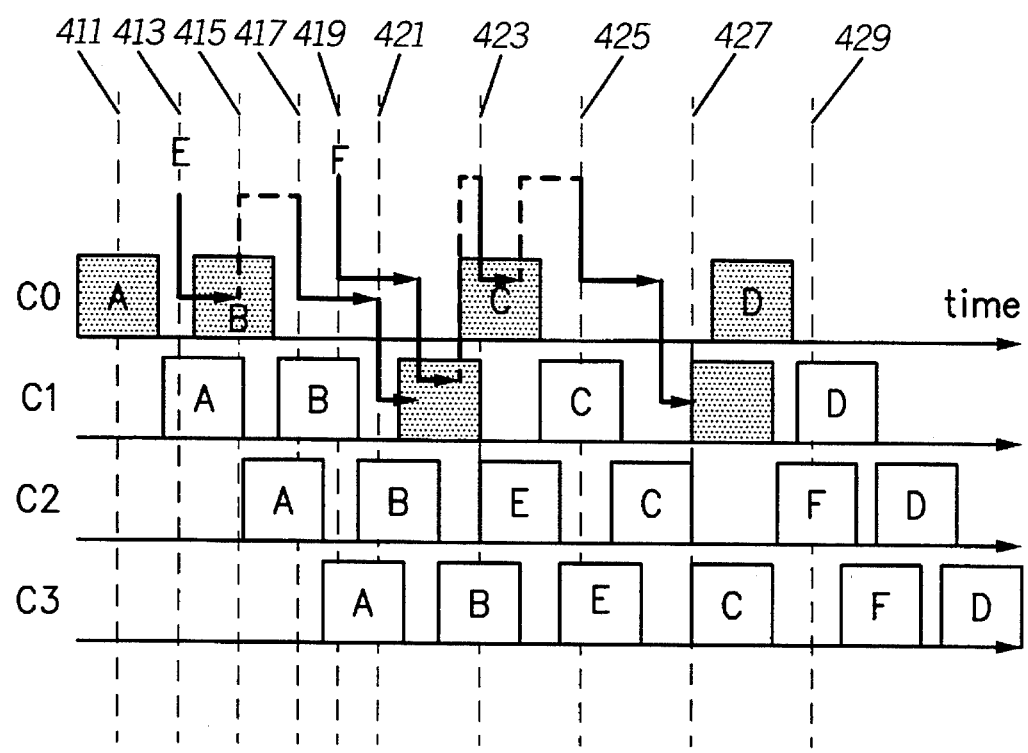
FIG. 4 is a timing diagram of potential activity on a portion of the sequence of communication channels, in accordance with the present invention.

The protocol of the preferred invention can be further explained with reference to FIG. 4. FIG. 4 is a timing diagram of activity on the sequence of communication channels (only four channels shown) in accordance with the second embodiment of the present invention. The communication channels shown include a reservation channel C0, and a collision avoidance channel C1. Channels C2 and C3 are only used as ordinary data communication channels. At a time 411, transceiver group A is operating the reservation channel C0, and consequently is transmitting a reservation signal. At time 413, a transceiver E begins an attempt to establish communication on the sequence of communication channels. Transceiver E monitors the reservation channel C0 for at least a hop period during which transceiver group A has moved on to a subsequent channel, C1. At time 415 transceiver E detects the reservation signal of transceiver group B being transmitted on the reservation channel C1. Group B is operating on the sequence and wishes to preserve its communication slot, thus transceiver E must repeat the monitoring process. To secure a communication slot, transceiver E keeps monitoring the reservation channel until a gap of at least the duration of a channel hop period is detected. At time 417, transceiver E begins again to monitor the reservation channel, and monitors it until time 421, which is at least the duration of a channel hop period. Having detected a gap greater or equal to the channel hop period, transceiver E begins to establish communication by first determining whether there is a channel busy signal on channel C1. As there is no busy signal, transceiver E begins transmitting a channel busy signal for the duration of a channel hop period on channel C1.

At time 419, transceiver F attempts to acquire a communication slot on the sequence of communication channels, and monitors the reservation channel for a duration of at least a channel hop period. Transceiver F does not detect a reservation signal within the monitor period, and essentially detects at least a portion of the same gap that transceiver E detected. Transceiver F then determines whether a channel busy signal is being transmitted on the collision avoidance channel. Transceiver F detects the channel busy signal being transmitted by transceiver E and terminates operating of the sequence. Transceiver E secures the open communication slot and proceeds to establish communication with a target transceiver on channel C3. Transceiver F restarts the monitor process at time 423 and detects a reservation signal being transmitted by transceiver C. Transceiver F keeps monitoring the reservation channel until it detects a gap at time 425 in which no reservation signals are detected for at least the duration of a channel hop period. Thus, at time 427, transceiver F transmits a channel busy signal on the collision avoidance channel, for at least a channel hop period. At time 429, transceiver F is able to claim the open communication slot.

Figure 5:
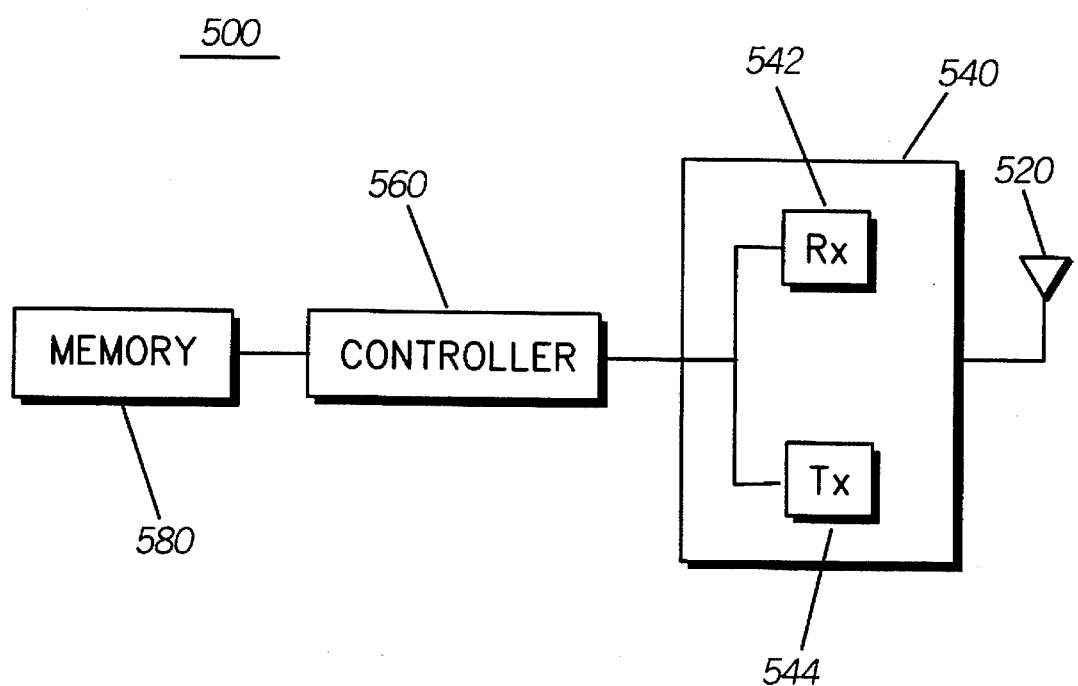
FIG. 5 is a block diagram of a radio capable of organizing a radio communication system, in accordance with the present invention.

FIG. 5 shows a portion diagram of a radio 500 capable of organizing, or participating in, the radio communication system described above, in accordance with the present invention. The transceivers 113, 114, 116, 117, 118, described above are similar in structure and functionality. The radio 500 is an electronic communication device used for two-way communication, and is capable of receive and transmit operation using well known principles. A controller 560 uses logic and other information from an electrically coupled memory portion 580 to control the overall operation of the radio 500. The controller 560 is electrically coupled to an RF portion 540 which includes a receiver 542 and a transmitter 544. The RF portion 540 is electrically coupled to an antenna 520. For receive operations, communication signals are received by the antenna 520 and are selectively processed by the receiver 542. Similarly, for transmit operations, communication signals are processed by the transceiver 544 and radiated through the antenna 520. The transmitter 544 and receiver 542 operate under the control of the controller 560. According to the invention, the controller 560, cooperates with the memory portion 580, and RF portion 540, to perform the communication management protocol functions, including the system acquisition and communication slot preservation protocol described above.

In summary the present invention provides for a radio communication system including a channel management protocol and devices capable of operating under that protocol. Using the communication device and protocol, two or more communicating groups can be organized to substantially reduced the potential of interference among them, and to substantially improve the efficient use of communication channels. In the preferred embodiment, a plurality of frequencies are organized into a sequence of communication channels. Transceivers already operating on the sequence of communication channels, transmit a reservation signal when on the reservation channel, to preserve a communication slot. A transceiver wishing to initiate communication on the sequence, first monitors the reservation channel, for at least the duration of a channel hop period, to detect whether a reservation signal is being transmitted. If no reservation signal is detected within the channel hop period, the initiating transceiver assumes the potential of an open communication slot and proceeds to establish communication with a target transceiver. In a second embodiment, the channel of the sequence immediately succeeding the reservation channel is used for collision avoidance during system acquisition. Once an open communication slot is acquired, the transceiver operates on the sequence of communication channels under the channel hoping protocol including the channel hop period.

The communication device and communication channel management protocol describe offers several advantages. For example, a method is provided for sharing available communication channels while reducing interference between communicating groups. A transceiver wishing to operate within the sequence of communication channels does not need to locate precise boundaries of communication slots used by other communicating groups. Rather, the initiating transceiver locates a communication slot and channel hops, according to a defined channel hop period to ensure that communication slots are not overlapped. In effect, different communicating groups operating on the sequence of communicating channel, will channel hop in a time coordinated manner to avoid overlapping channel usage. By coordinating channel hopping of communicating groups, the likelihood of interference is reduced. Additionally, by requiring that a communication slot within the sequence of communication channel is reserved into order to maintain that communication slot, an orderly acquisition methodology is established. The present invention provides for efficient use of communication channels. Yet this efficient channel utilization is accomplished without the use of a central controller, such as a base station, and the like, because the protocol capability is incorporated into each transceiver. The result is a low cost radio communication system which promotes efficient use of shared communication resources.

What is claimed is:

1. A method of operating a radio communication system, the radio communication system having first and second transceivers, the method comprising the steps of:

selecting a sequence of communication channels;

selecting a reservation channel from among the sequence of communication channels;

providing a channel hop period defining a limit on continuous utilization of a particular communication channel for channel hopping on the on the sequence of communication channels;

at the first transceiver:

reserving a communication slot, for operating on the sequence of communication channels, by transmitting a reservation signal, for a particular duration, on the reservation channel; and operating on successive channels of the sequence of communication channels, using the communication slot, during successive channel hop periods;

at the second transceiver:

monitoring the reservation channel to detect a reservation signal;

determining that an open communication slot exists on the sequence of communication channels when a reservation signal is not present; and establishing communication using the open communication slot, on the sequence of communication channels, when an open communication slot exits.

2. The method of claim 1, wherein the step of monitoring the reservation channel, comprises the step of monitoring the reservation channel for a duration of at least the channel hop period.

3. The method of claim 1, wherein the step of establishing communication, comprises the steps off at the second transceiver:

selecting a collision avoidance channel from among the sequence of communication channels;

monitoring the collision avoidance channel within the open communication slot to detect a channel busy signal;

terminating communication on the sequence of communication channels when a channel busy signal is detected; and transmitting a channel busy signal on the collision avoidance channel within the open communication slot when a channel busy signal is not detected.

4. The method of claim 3, wherein the step of selecting a collision avoidance channel, comprises the step of selecting a communication channel immediately succeeding the reservation channel within the sequence of communication channels.

5. The method of claim 1, further comprising the step of reserving, by the second transceiver, a communication slot for operating on the sequence of communication channels by transmitting a reservation signal when on the reservation channel.

6. The method of claim 1, wherein the step of transmitting a reservation signal, comprises the step of transmitting a signal having a range extending beyond communication range on other communication channels of the sequence of communication channels.

7. A method of establishing communication on a radio communication system, the radio communication system having a sequence of communication channels, including a reservation channel, and a channel hopping protocol for operating on the sequence of communication channels, the channel hopping protocol having a channel hop period defining a limit on continuous utilization of a particular communication channel, the method comprising the steps of:

monitoring the reservation channel for a duration of at least the channel hop period to detect a reservation signal;

determining that an open communication slot exists when a reservation signal is not present;

establishing communication, using the open communication slot, on the sequence of communication channels when an open communication slot exists;

communicating on successive communication channels of the sequence using the channel hopping protocol; and transmitting a reservation signal on the reservation channel when on the reservation channel.

8. A method of operating a radio communication system having a sequence of communication channels, the radio communication system having a first transceiver operating on the sequence of communication channels, and a second transceiver attempting to operate on the sequence of communication channels, the method comprising the steps of:

providing a channel hopping protocol for operating on the sequence of communication channels, the channel hopping protocol having a channel hop period defining a limit on continuous utilization of a particular communication channel;

selecting a reservation channel from among the sequence of communication channels;

at the first transceiver:

communicating on successive communication channels of the sequence, including the reservation channel, using the channel hopping protocol; and transmitting an extended range reservation signal on the reservation channel when on the reservation channel;

at the second transceiver:

monitoring the reservation channel for a duration of at least the channel hop period, to detect the extended range reservation signal;

determining that an open communication slot exits on the sequence of communication channels when the extended range reservation signal is not present; and establishing communication on the sequence of communication channels, using the open communication slot, when an open communication slot exists.

9. The method of claim 8, wherein the step of establishing communication, comprises the steps of: at the second transceiver:

selecting a communication channel immediately succeeding the reservation channel within the sequence of communication channels as a second reservation channel;

monitoring the second reservation channel within the communication slot to detect a channel busy signal;

terminating communication on the sequence of communication channels when a channel busy signal is detected; and transmitting a channel busy signal on the second reservation channel within the communication slot when a channel busy signal is not detected.

* * * * *